July 23, 1957 P. G. KAPPUS 2,799,989
VARIABLE AREA JET NOZZLE
Filed Sept. 24, 1954 3 Sheets-Sheet 3

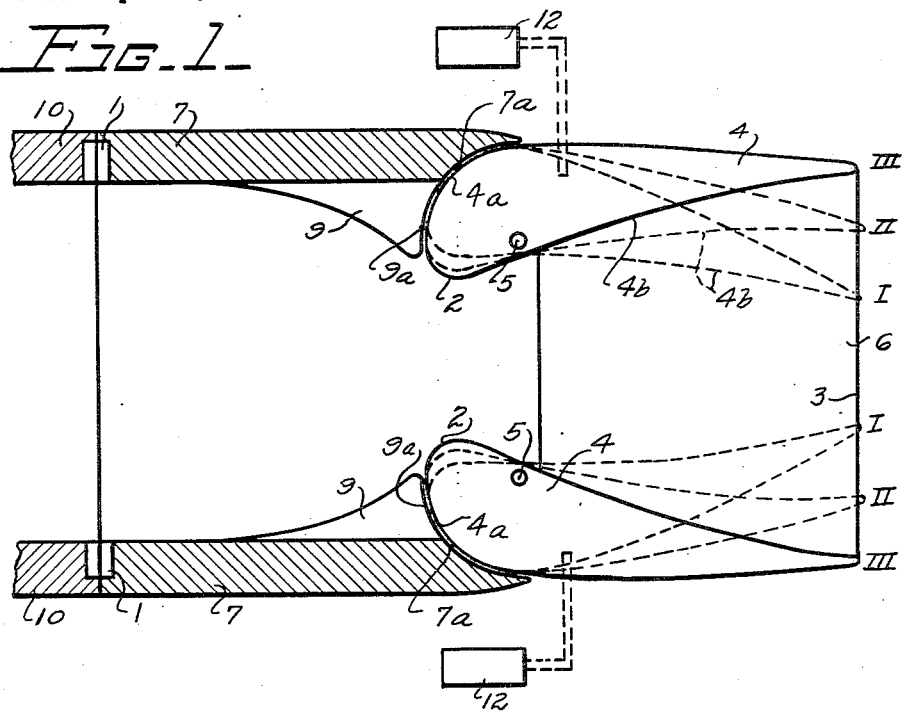
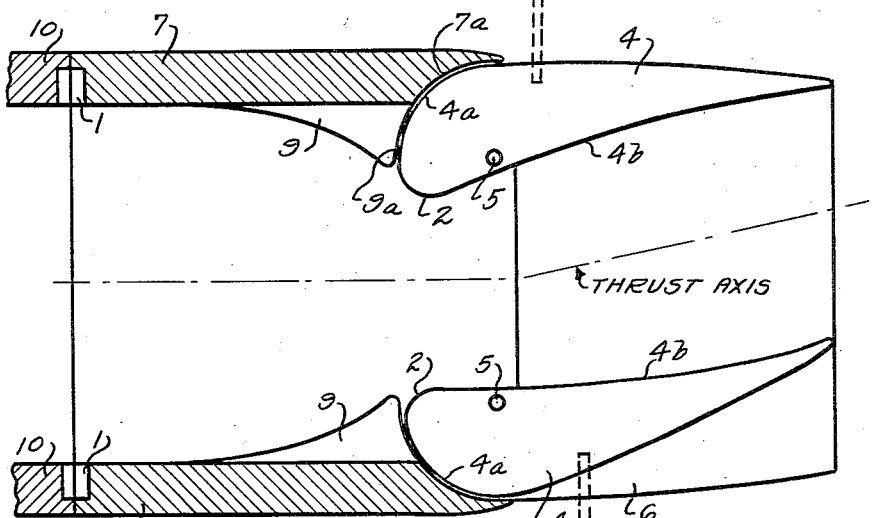

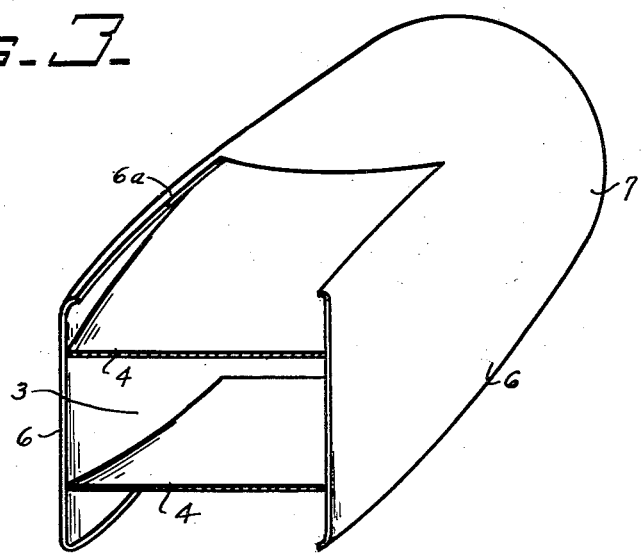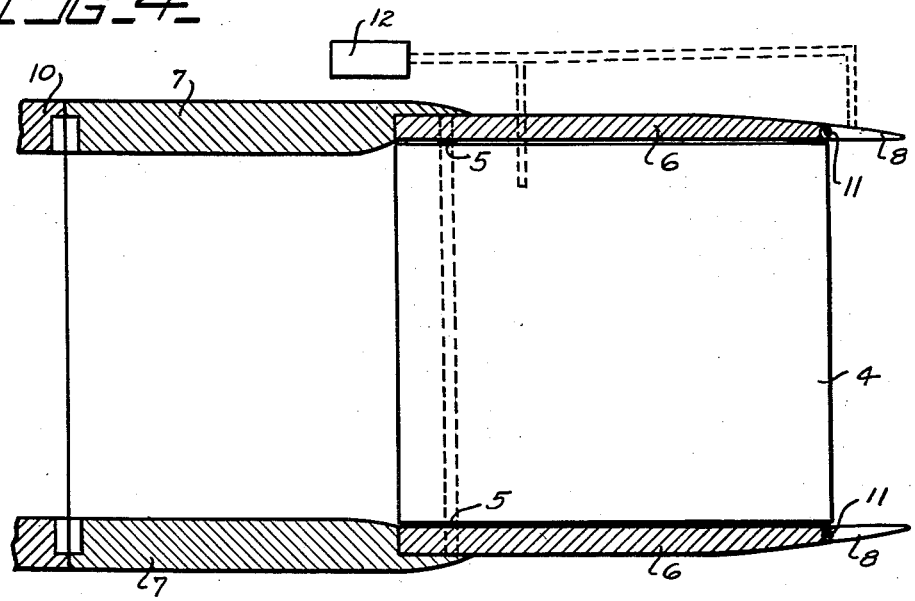

INVENTOR.
PETER G. KAPPUS
BY
ATTORNEYS

United States Patent Office 2,799,989
Patented July 23, 1957

2,799,989
VARIABLE AREA JET NOZZLE

Peter G. Kappus, Cincinnati, Ohio, assignor to the United States of America as represented by the Secretary of the Air Force Application September 24, 1954, Serial No. 458,295

6 Claims. (Cl. 60—35.55)

(Granted under Title 35, U. S. Code (1952), sec. 266)

The invention described herein may be manufactured and used by or for the Government for governmental purposes without the payment of any royalty thereon.

This invention relates to nozzles of the variable flow area type intended for use with a jet power plant.

It is an object of the invention to provide for a turbojet, or the like, a nozzle having a discharge passage or bore which is continuously variable in shape from converging to converging-diverging in order to be adapted to a wide range of operating velocities and conditions from subsonic to supersonic.

It is another object of the invention to provide a nozzle which in its converging-diverging position has a throat area which may be adjustably reduced at supersonic speeds to reduce reheat temperature in order to achieve greater cruising economy.

It is a further object of the invention to provide such a nozzle which can also be used for control or trim of the aircraft or missile.

It is a further object of the invention to provide such a nozzle which can be completely closed to avoid windmilling drag of the inoperative engine in a plural jet installation.

It is a further object of the invention to provide such a nozzle having a discharge orifice which in its maximum open position is square so that when two or more such nozzles are mounted adjacent each other the base area between the two nozzles will be a minimum in order to avoid the base drag caused, for example, by the unavoidable base area between two circular outlet nozzles mounted adjacent each other. On the other hand, it is desired to retain individual and independent control of the outlet nozzles of each of a plurality of jets which could not be accomplished if the plurality of turbojets were simply discharged into one large nozzle having a rectangular outlet at its maximum open position.

It is a further object of the invention to provide such a nozzle having a pair of vanes which in addition to control of the discharge passage area may also be used to vary the angle of the discharge thrust axis.

A further object of the invention is to provide such a nozzle which is simple in construction and which may be made sufficiently durable to withstand the high temperatures and pressures encountered in supersonic use. Features of the invention more fully described hereinafter include a nozzle consisting of a main body which is of circular cross-section at its inlet end and tapers to substantially square cross-section at its discharge end at which point a stationary extension wall continues from each of two opposed sides of the square. Pivotally attached to the other two sides of the square are a pair of vanes of generally teardrop cross-section which in cooperation with shaping members in the interior bore of the main body control the shape and area of the discharge passage as well as the angle of its axis of thrust. These and other objects and advantages are effected by the invention as will be apparent from the following description and claims taken in connection with the accompanying drawing, forming a part of this application, in which:

Fig. 1 is a vertical cross-section of the nozzle showing three different positions of the vanes;

Fig. 2 is a vertical cross-section similar to Fig. 1 but showing the vanes set to change the angle of the axis of thrust;

Fig. 3 is a perspective view of a modification of the nozzle;

Fig. 4 is a horizontal cross-section of a further modification of the nozzle;

Figure 5:
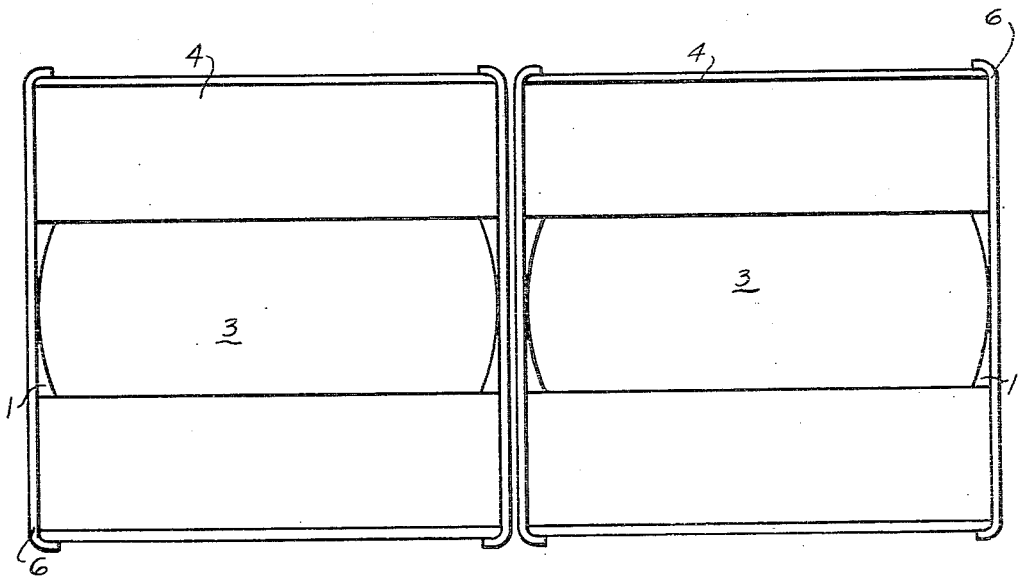
Fig. 5 is an end elevational view of a further modification showing the nozzle of Fig. 1 in a plural installation.

Referring now to Fig. 1 of the drawing, the nozzle of the invention is shown attached to the rear end 10 of a jet power plant of any suitable design by means of an annular attaching flange conventionally indicated at 1. The main body 7 of the nozzle is of circular cross-section at its inlet end to which the flange 1 is attached. Mounted within the bore of the main body 7 are a pair of shaping members 9 which render the bore convergent toward its discharge end. The end surfaces 9a of these shaping members form with the end surfaces 7a of the main body a surface which is an arc of a circle. The shaping members 9 may be attached to the main body by any suitable means or they could of course be made as an integral part of the main body.

Fixedly attached to the main body at opposite sides of its substantially square discharge end are a pair of extension walls 6. These walls terminate in straight vertical edges which form two opposite and fixed sides of the discharge orifice 3 which is a rectangle of variable area as will appear later.

As shown in Fig. 3, the extension walls 6 may also be made as an integral part of the main body 7.

Pivotally mounted in perpendicular relation to the fixed extension walls 6 are two vanes 4 of generally teardrop cross-section, the terminal edges of which form the two sides of the discharge orifice 3 which are perpendicular to the terminal edges of the extension walls 6.

The vanes 4 have a surface 4a at their enlarged ends which is an arc of a circle and which mates for pivotal adjustment of the vanes with the surface 7a, 9a of the main body member and shaping member. The vanes are pivotally mounted on a rod 5 which is attached to the main body 7 and which passes through the vanes 4 at a point which is the center of the circle of which the surface 4a is an arc. Any suitable means, mechanical or electrical, may be used to control the position adjustment of the vanes 4. Since the details of the control mechanism do not form a part of this invention, the control means are indicated schematically at 12.

The vanes 4 have an inner surface 4b which is concave with respect to the axis of discharge of the nozzle. This surface 4b merges with the surface 4a at a point 2 which is somewhat upstream of the pivot point 5. The merger point 2 forms a throat section within the nozzle which throat varies in area as the position of the vanes 4 is changed.

In Figure 1 three positions of the vanes 4 are shown by way of illustration, but it will be understood that the vanes are continuously adjustable from a fully closed position (not shown) to a maximum open position (III in Fig. 1) in which the vanes are stopped by lips 6a on the fixed extension walls 6. It will be noted that as the vanes are moved toward open position the area of the discharge orifice 3 increases while the area of the throat decreases as the points 2 move closer together.

Referring still to Fig. 1 it will also be noted that in position I the concave surface 4b forms a continuation of the convergence of the surface of the member 9 so that the nozzle discharge passage is entirely convergent. This position with small area at the nozzle exit is intended to be used, for example, for subsonic cruise without reheat. When the vanes 4 are moved to position II the nozzle discharge passage assumes a converging-diverging shape. This position is intended to be used, for example, for full reheat operation at low speeds and for acceleration through the transonic speed range with high reheat temperatures. The fully open position III also gives a converging-diverging nozzle with high expansion ratio intended for use in supersonic cruise at high Mach numbers and moderate reheat temperatures for cruising economy. Obviously continuously variable intermediate positions are possible to match the whole range of speed and reheat temperatures.

It will be noted that in the fully open supersonic cruise position III, the jet emerging from the square discharge orifice 3 is about as large in cross-section as the diameter of the main body 7 in order to eliminate boat tail drag.

Fig. 2 shows a further valuable feature of this invention which consists in varying the angle of the thrust axis by unequal actuation of the vanes. The control or trim forces produced in this way can be very valuable to obtain or increase controllability or trim under off design conditions such as vertical take-off, shifting center of gravity, or during passage through the transonic region where controllability with conventional means is impaired due to travel of the center of pressure.

Figure 4 shows the further possibility of attaching rudderlike control surfaces 8 to the fixed extension wall 6 by means of pivots 11 in order to produce side forces for additional controllability essential during vertical take off.

Figure 5 illustrates the superiority of the square shaped nozzle form as to drag if a twin installation in a nacelle or body is required. Two circular jet nozzles result in considerable base drag caused by the unavoidable base area between the two nozzles. One large rectangular nozzle for the two jets does not permit individual control, and in particular would not permit one nozzle to be completely closed in order to avoid windmilling drag of an inoperative engine. Two square shaped nozzles can be installed side by side with a minimum of base drag area.

It is thus seen that I have provided a nozzle which is simple in construction and can be made extremely durable for high temperature operation and yet which affords a very flexible control of the jet discharge. In particular it is possible by the use of the same pair of vanes to produce at will a convergent duct or a convergent-divergent duct of various critical areas for various expansion ratios. Furthermore the same pair of vanes may be used to vary the thrust axis of the jet in order to aid in control of the plane or missile.

Having thus fully described my invention, what I claim is:

1. In combination with a jet propulsion power plant, a jet nozzle having a main body of circular cross-section at its inlet end and tapering to substantially square cross-section at its discharge end; a pair of extension walls continuing rearwardly from opposite sides of said substantially square discharge end; a pair of members mounted within the bore of said main body near the discharge end thereof and terminating at the sides of said substantially square discharge which are at right angles to said extension walls; the inner surfaces of said members having a concave taper so that they form with the bore of the main body a bore which converges continuously toward the substantially square discharge end of the main body; the end surfaces of said members being concave inwardly from the discharge end of said main body; a pair of vanes mounted perpendicularly to said extension walls and pivotally attached to said main body; means to adjust the position of said vanes about an axis of pivotal rotation, said axis being perpendicular to the plane of said extension walls, said vanes being of generally teardrop cross-section and said pivot point being near the larger end of said vanes so that the convex surfaces of the larger ends of said teardrop vanes mate with the concave surfaces of the ends of the members mounted within the main body; a cross section of said vanes formed by the intersection with said vanes of a plane parallel to said extension walls having inner vane surfaces which are concave in relation to and away from the axis of the bore of said nozzle so as to form a continuation of the convergence of the bore of said main body when said vanes are near closed position and to form a continuous surface convergent-divergent nozzle bore having its throat near the outlet end of said main body when said vanes are near open position; said vanes tapering to form in cooperation with said extension walls a discharge orifice which is a right parallelogram of variable area, the bore of said nozzle having in any position of said vanes an aerodynamically continuous surface from the inlet end of said main body to the discharge orifice of said nozzle, and the ratio of the area of said discharge orfice to the area of said throat section being uniquely determined by any given positional adjustment of said vanes, said teardrop shape of said vanes being such that said ratio increases proportionately as the area of said discharge orifice increases, the factor of proportionality being greater than one for any position of said vanes which produces a convergent-divergent nozzle.

2. Apparatus as in claim 1 in which said vanes are continuously adjustable from a fully closed position to a maximum open position in which the discharge orifice is a square having each side equal in length to the diameter of the inlet end of the main body.

3. Apparatus as in claim 1 in which rudder control flaps are attached to the discharge end of said extension walls.

4. Apparatus as in claim 1 in which a plurality of said jet nozzles are mounted in juxtaposition with the flat surfaces at the discharge end of said extension walls in contact so as to minimize the base drag area between adjacent discharge orifices.

5. Apparatus as in claim 1 wherein said extension walls are separate from and fixedly attached to said main body at its discharge end.

6. Apparatus as in claim 1 in which said vanes are independently adjustable through a range of positions in order to change the angle of the axis of thrust of said jet discharge nozzle.

References Cited in the file of this patent

UNITED STATES PATENTS

| | | |
|---|---|---|
| 340,237 | Nagel et al. | Apr. 20, 1886 |
| 1,698,822 | Paxton | Jan. 15, 1929 |
| 2,420,323 | Meyer et al. | May 13, 1947 |
| 2,481,330 | Neal | Sept. 6, 1949 |
| 2,488,174 | Clegern | Nov. 15, 1949 |
| 2,569,996 | Kollsman | Oct. 2, 1951 |
| 2,603,062 | Weiler et al. | July 15, 1952 |
| 2,625,008 | Crook | Jan. 13, 1953 |

FOREIGN PATENTS

| | | |
|---|---|---|
| 580,995 | Great Britain | Sept. 26, 1946 |